US012775886B2

(12) United States Patent
Tensmeyer et al.

(10) Patent No.: US 12,775,886 B2
(45) Date of Patent: Oct. 27, 2026

(54) CONFIDENCE EVALUATION MODEL FOR STRUCTURE PREDICTION TASKS

(71) Applicant: Adobe Inc., San Jose, CA (US)

(72) Inventors: Christopher Tensmeyer, Fulton, MD (US); Nikolaos Barmpalios, Palo Alto, CA (US); Sruthi Madapoosi Ravi, San Jose, CA (US); Ruchi Deshpande, Belmont, CA (US); Varun Manjunatha, Newton, MA (US); Smitha Bangalore Naresh, Sudbury, MA (US); Priyank Mathur, San Jose, CA (US); Oghenetegiri Sido, Fremont, CA (US)

(73) Assignee: ADOBE INC., San Jose, CA (US)

( * ) Notice: Subject to any disclaimer, the term of this patent is extended or adjusted under 35 U.S.C. 154(b) by 1110 days.

(21) Appl. No.: 17/815,448

(22) Filed: Jul. 27, 2022

(65) Prior Publication Data

US 2024/0028972 A1 Jan. 25, 2024

(30) Foreign Application Priority Data

Jul. 22, 2022 (GR) .............................. 20220100590

(51) Int. Cl.
*G06N 20/20* (2019.01)
*G06F 18/21* (2023.01)
*G06F 18/214* (2023.01)

(52) U.S. Cl.
CPC ........... *G06N 20/20* (2019.01); *G06F 18/214* (2023.01); *G06F 18/217* (2023.01)

(58) Field of Classification Search
CPC ........ G06N 20/20; G06N 3/045; G06N 3/084; G06F 18/214; G06F 18/217; G06V 30/413; G06V 10/82
See application file for complete search history.

(56) References Cited

U.S. PATENT DOCUMENTS 12,094,231 B1 * 9/2024 Buban .................... G06V 10/82
2020/0151444 A1 * 5/2020 Price ........................ G06N 3/08
(Continued)

OTHER PUBLICATIONS

Dong H, Liu S, Han S, Fu Z, Zhang D. Tablesense: Spreadsheet table detection with convolutional neural networks. InProceedings of the AAAI conference on artificial intelligence Jul. 17, 2019 (vol. 33, No. 01, pp. 69-76). (Year: 2019).*
(Continued)

*Primary Examiner* — Oluwatosin Alabi
(74) *Attorney, Agent, or Firm* — F. CHAU & ASSOCIATES, LLC

(57) ABSTRACT

Techniques for training for and determining a confidence of an output of a machine learning model are disclosed. Such techniques include, in some embodiments, receiving, from the machine learning model configured to receive information associated with a data object, information associated with a predicted structure for the data object; encoding, using a second machine learning model, the information associated with the predicted structure for the data object to produce encoded input channels; evaluating, using the second machine learning model, the information associated with the data object with the encoded input channels; and based on the evaluating, determining, using the second machine learning model, a probability of correctness of the predicted structure for the data object.

19 Claims, 9 Drawing Sheets

(56) References Cited

U.S. PATENT DOCUMENTS

| | | | | |
|---|---|---|---|---|
| 2021/0406644 | A1* | 12/2021 | Salman | G06N 3/08 |
| 2022/0027740 | A1* | 1/2022 | Dong | G06F 18/214 |
| 2022/0036548 | A1* | 2/2022 | Hu | G06V 20/693 |
| 2022/0301156 | A1* | 9/2022 | Fang | G16H 50/70 |
| 2022/0335240 | A1* | 10/2022 | Smock | G06N 3/0464 |
| 2023/0334814 | A1* | 10/2023 | Ranganathan | G06N 3/0895 |

OTHER PUBLICATIONS

Dral, E. et al., “Can you build a machine learning model to monitor another model?”, Evidently AI, Apr. 23, 2021 [online], 10 pages. URL: https://evidentlyai.com/blog/can-you-build-a-model-to-monitor-a-model [retrieved Jul. 27, 2022].

Iida, H. et al., “TABBIE: Pretrained Representations of Tabular Data”, Proc. of the 2021 Conference of the North American Chapter of the Association for Computational Linguistics: Human Language Technologies, 2021, pp. 3446-3456. doi: 10.18653/V1/2021.NAACL-MAIN.270.

Kalra, B. et al., “RISAN: Robust Instance Specific Deep Abstention Network”, Proc. of the 37th Conference on Uncertainty in Artificial Intelligence, PMLR, 2021, vol. 161, pp. 1525-1534.

Malik, J. et al., “Contour and Texture Analysis for Image Segmentation”, submitted to the International Journal of Computer Vision, Dec. 1999, 34 pages. URL: https://www.cnbc.cmu.edu/~tai/readings/v1model/malik01contour.pdf.

Salimans, T. et al. “PixelCNN++: Improving the PixelCNN with Discretized Logistic Mixture Likelihood and Other Modifications”, Proc. of the 5th International Conference on Learning Representations, 2017, pp. 1-10.

Sharma, H. “Auto-Regressive Generative Models (PixelRNN, PixelCNN++)”, Towards Data Science, Dec. 22, 2017 [online], 11 pages. URL: https://towardsdatascience.com/auto-regressive-generative-models-pixelrnn-pixelcnn-32d192911173 [retrieved Jul. 27, 2022].

Van Den Oord, A. et al. “Conditional Image Generation with PixelCNN Decoders”, Proc. of the 30th Conference on Neural Information Processing Systems, arXiv:1606.05328v2 [cs.CV], Jun. 18, 2016, 13 pages.

* cited by examiner

CONFIDENCE EVALUATION MODEL FOR STRUCTURE PREDICTION TASKS

BACKGROUND

While machine learning is a highly adaptable and time-efficient feature that can be implemented in components of software applications, such components are bound to fail at some point for reasons related to the nature of machine learning. Common causes include, but are not limited to, the input being sufficiently different from the training dataset for the machine learning model (e.g., out-of-distribution sample, anomalous or incorrect input), the input not being properly formatted, or a model that does not fully converge (and thus cannot properly handle the input). Nonetheless, it is critical for the success of any machine learning-driven feature or application to detect when a machine learning component fails so that downstream components can properly handle the failure scenario.

SUMMARY

Techniques for training for and determining a confidence of an output of a machine learning model are disclosed in the present disclosure.

In one aspect of the present disclosure, a system configured to evaluate a confidence of a structure prediction is disclosed. In some embodiments, the system includes: a first machine learning model configured to: receive an input comprising object data of an object within a document; and generate an output comprising a predicted structure for the object data, the predicted structure comprising predicted boundaries that contain one or more elements of the object corresponding to the object data; and a second machine learning model configured to: obtain the input and the output; encode the input and the output as a plurality of input channels; and determine a probability of correctness of the predicted boundaries of the predicted structure based on an evaluation of the plurality of input channels.

In another aspect of the present disclosure, a method of determining a confidence of an output of a first machine learning model is disclosed. In some embodiments, the method includes receiving, from the first machine learning model configured to receive information associated with a data object, information associated with a predicted structure for the data object encoding, using a second machine learning model, the information associated with the predicted structure for the data object to produce encoded input channels; evaluating, using the second machine learning model, the information associated with the data object with the encoded input channels; and based on the evaluating, determining, using the second machine learning model, a probability of correctness of the predicted structure for the data object.

In another aspect of the present disclosure, a non-transitory computer-readable apparatus is disclosed. In some embodiments, the non-transitory computer-readable apparatus includes a storage medium, the storage medium including a plurality of instructions configured to, when executed by one or more processors, cause a computerized apparatus to: receive, from a second machine learning model configured to receive information associated with a data object, information associated with a predicted structure for the data object; encode, using the first machine learning model, the information associated with the predicted structure for the data object to produce encoded input channels; evaluate, using the first machine learning model, the information associated with the data object with the encoded input channels; and based on the evaluation, determine, using the first machine learning model, a probability of correctness of the predicted structure for the data object.

In another aspect of the present disclosure, a machine learning model is disclosed. In some embodiments, the machine learning model is configured to: receive, from a second machine learning model configured to receive information associated with a data object, information associated with a predicted structure for the data object; encode the information associated with the predicted structure for the data object to produce encoded input channels; evaluate the information associated with the data object with the encoded input channels; and based on the evaluation, determine a probability of correctness of the predicted structure for the data object.

DETAILED DESCRIPTION OF EMBODIMENTS

Figure 1:
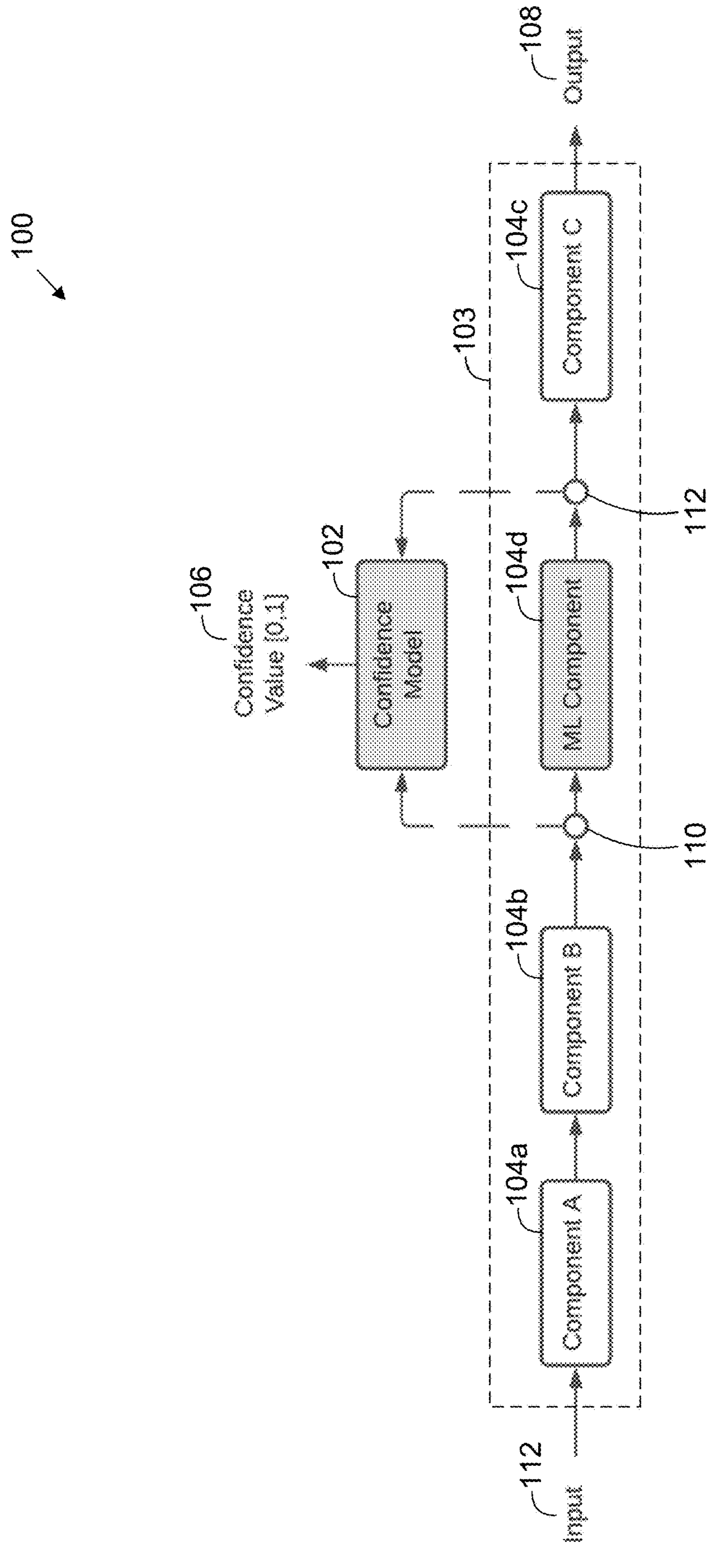
FIG. 1 illustrates an overview of an example architecture in which a confidence model is implemented to monitor for failure of a component of a machine learning model and generate a probability of correctness of the output of the machine learning component.

The present disclosure relates generally to the fields of machine learning, and more particularly, to determining a confidence of a machine learning model.

Conventional uncertainty modeling is geared toward classification or regression tasks. However, these models are known to be overconfident about their predictions. Thus, the probabilities obtained are not reasonable and not useful for predicting the correctness of the classification or regression tasks. Deep ensemble learning can reduce the overconfidence, but deep ensembles consist of randomly initialized, independently trained, and shared-architecture neural networks, which can increase the complexity and redundancy of the overall architecture. Moreover, more complex tasks, such as structure prediction, make the need for confidence more acute, as the correctness must apply to various parts of the structure, not simply a classification or linear regression.

For the task of table decomposition, for example, there is a lack of solutions for detecting failure of table decomposition models. One existing technique involves inferring table structure from images and providing a confidence score for each cell. However, this does not account for spanning cells (cells that have merged), nor do the confidence scores necessarily indicate the confidence for the correctness of the table structure as a whole. For example, low confidence scores do not necessarily mean that the table structure is incorrect. Further, per-cell confidence scores instead of a table-level score complicate the application logic that determines whether a table is judged as correct or not.

To these ends, what is desired and needed is a new type of confidence model that can predict the likelihood of correctness of the output of a structure prediction model. As will be discussed below, the new confidence model examines the input and output of the machine learning model being monitored, and outputs a score (e.g., between 0 to 1) that indicates the likelihood that the output itself (not parts thereof) is correct, which can indicate whether the model or component being monitored has failed. An advantage of this type of confidence model is that it is able to provide confidence scores of any algorithm and predict when any machine learning component of a pipeline fails. It is critical for the success of any machine learning feature or application to determine failure so that downstream components can, e.g., properly handle the failure scenario. Thus, this type of confidence model is highly adaptable and widely applicable, e.g., to systems and applications involving multiple inputs and outputs.

An additional advantage of this type of confidence model is increased time efficiency in training and development of models because the confidence model can learn from outputs which are naturally generated during execution of an application pipeline or production system. For example, the confidence model can use outputs (e.g., table decomposition outputs) from the production system to automatically tune to new versions of the production table decomposition algorithm. This can be done without additional input or annotation, which translates to less research and development time.

Example Implementation of Confidence Model

Consider a scenario in which a component of a machine learning model is being monitored for failure by a confidence model. FIG. 1 illustrates an overview of an example architecture 100 in which a confidence model 102 is implemented to monitor for failure of a component 104*d* of a machine learning model 103 and generate a probability of correctness of the output of the machine learning component 104*d*. The probability of correctness is represented by a value 106. The confidence model 102 is trained to output a score that includes a value 106 between 0 and 1, inclusive, that indicates the likelihood that the output 108 of the machine learning model 103 is correct.

In some embodiments, the machine learning model 103 includes multiple components, including components A, B and C 104*a*-104*c* and the component 104*d* being monitored. In some embodiments, the confidence model 102 monitors the input 110 and the output 112 of the component 104*d* being monitored.

In some cases, however, the confidence model 102 receives the input and output from different components. For example, the confidence model 102 receives the input 112 to the model 103 (which is also the input to the first component A 104*a*) and receives the output 108 of the model 103, in effect monitoring the entire model 103. However, in another example, the confidence model 102 receives the input to component B 104*b* and the output 112.

In some embodiments, the machine learning component 104*d* (or the machine learning model 103) is configured to perform table decomposition. Such component or model is here referred to as a table decomposition model. Table decomposition is a critical aspect of document structure understanding, and, in this context, refers to the task for decomposing objects such as tables into rows, columns, and cells. In some embodiments, the tables may be embedded in Portable Document Format (PDF). Table decomposition is a complex task (relative to, e.g., classification or regression). As such, accurate table decomposition is not always guaranteed. Given the importance of table decomposition, however, it is important to monitor how well the table decomposition model or a component thereof (e.g., machine learning component 104*d*) works to ensure a satisfactory user experience.

Figure 2:
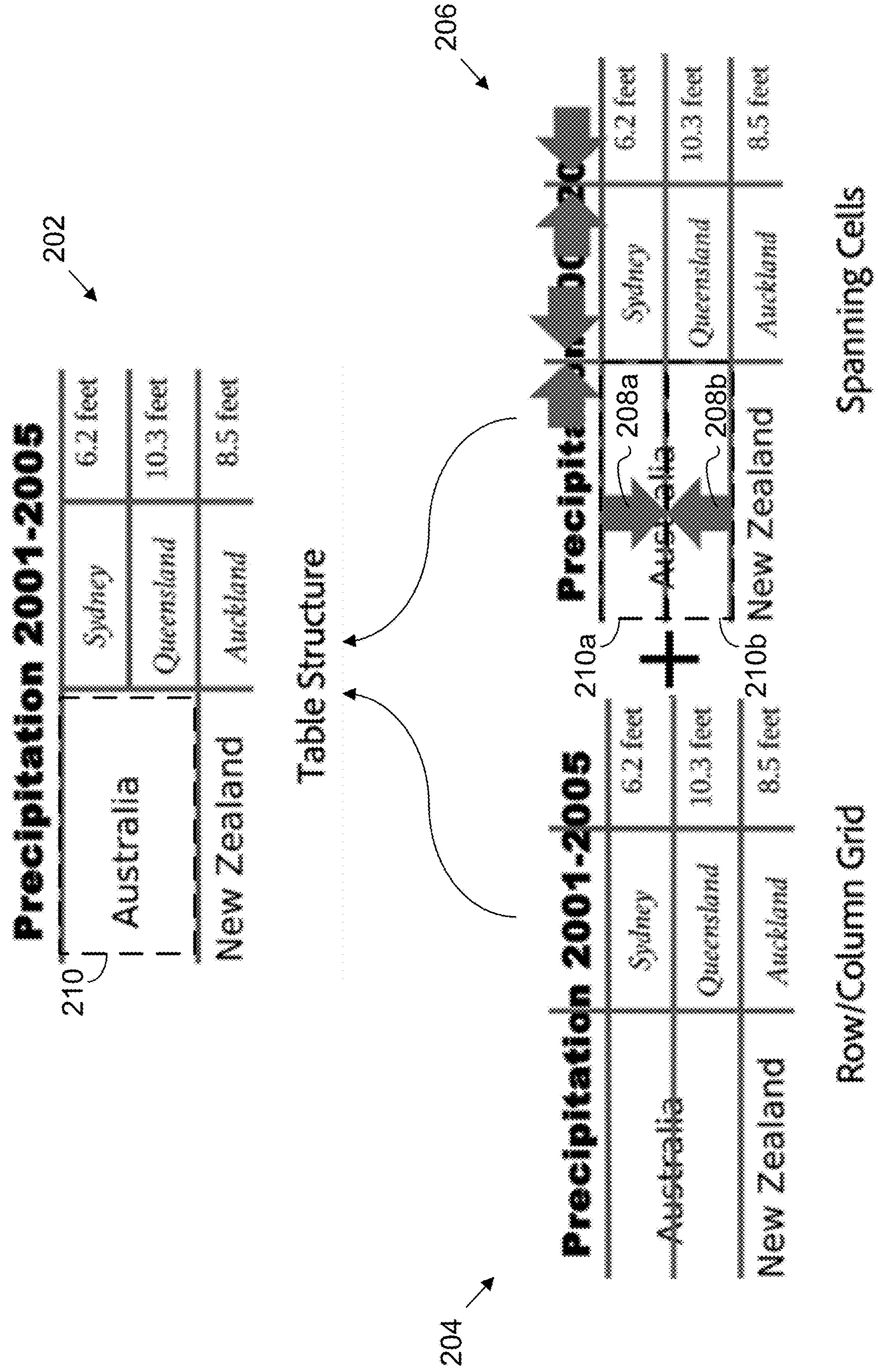
FIG. 2 is a simplified example of a table decomposition task that forms a table structure based on coordinates that form a grid in the table structure, and indications of grid rectangles to be combined to form spanning cells to result in the example table structure.

FIG. 2 illustrates a simplified example of a table decomposition task that forms a table structure 202 based on coordinates that form a grid 204 in the table structure, and indications of grid rectangles to be combined to form spanning cells 206 to result in the example table structure. The arrows 208*a* and 208*b* indicate that the corresponding cells 210*a* and 210*b* should be combined or merged into one cell 210.

In some embodiments, multiple machine learning components are used to generate the table structure 202. For example, a table structure can be thought of as two parts: the row/column grid 204 and a set of spanning cells 206. The two parts can be generated by respective ones of a pipeline or sequence (in a so-called ensemble) of machine learning components, which are utilized in a single overarching model (e.g., machine learning model 103 shown in FIG. 1). For example, a table decomposition model may include an ensemble of "split models," which predict the table grid 204, and a "merge model," which predicts spanning cells 206. Multiple confidence models can be used in conjunction, one per machine learning component. In some implementations, a pair of binary classifiers can be used as confidence models, one of which predicts the correctness of only the grid 204 and the other of which predicts the correctness of only the spanning cells 206. That is, each component can be monitored for failure or correctness by a corresponding confidence model.

Confidence Models

Figure 3A:
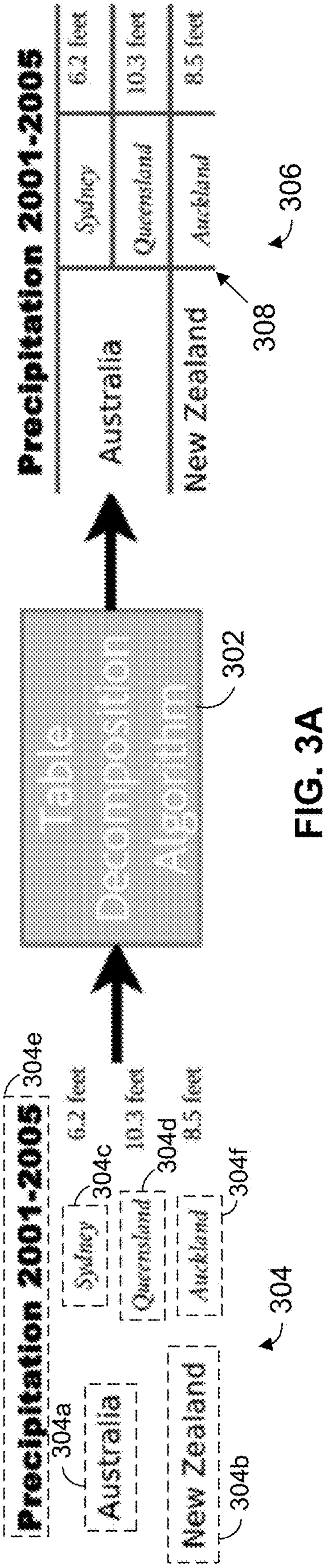
FIG. 3A depicts an example structure prediction model configured to receive an object and generate an output that includes a structure 306 for the object.

FIG. 3A depicts an example structure prediction model 302 configured to receive an object 304 and generate an output that includes a structure 306 for the object. In some embodiments, the prediction model 302 may be a table decomposition model that includes a table decomposition algorithm, which is configured to receive a table 304 and generate a table with table structure 306. Table structure 306 may be an example of the table structure 202 shown in FIG. 2. The table structure is indicated by the lines that extend between table elements 304*a*-304*e*. In some cases, table elements may include text as shown in FIG. 3A, which may or may not be optically recognized (e.g., using optical character recognition (OCR)). In some cases, the table elements may include images or vector graphics.

In some embodiments, a confidence model (e.g., confidence model 102 of FIG. 1) is trained to examine an object (e.g., table 304) with its corresponding decomposition result (e.g., table structure 306) from a decomposition model (e.g., table decomposition model 302), and output a probability that the result is a correct decomposition. To do so, a training set is constructed. In some embodiments, each training instance of the training set includes three portions:

(1) The object. An example of the object is a PDF table (e.g., table 304), which is a table containing table elements such as text (e.g., elements 304*a*-304*e*) embedded in PDF. Object data corresponding to the table is the same information provided to a table decomposition algorithm (e.g., of the table decomposition model 302).

(2) The output structure of the decomposition model (e.g., the table decomposition model). An example of the output is a table structure 306 generated by a table decomposition algorithm 302. In some embodiments, this output includes coordinate information about locations of rows and columns, as well as which cells span multiple rows or columns. In some implementations, the output also includes additional information from the decomposition model, such as per-pixel predicted probabilities.

The structure is not inherent in the object (e.g., table) itself; it is inferred by a viewer (e.g., a user). In various applications, the structure is a way to identify locations of object elements (e.g., text within table), lines of the object (e.g., grid lines for table text), and positions of lines with respect to the elements.

(3) A binary label indicating if the output structure is a correct structure for the input. For example, the binary label indicates that the output table structure is the correct structure for the input PDF table.

In some embodiments, the first two portions (e.g., the PDF table and the output table structure) form the input to the confidence model during training. The third portion (the binary label) is the training target and can be automatically derived from comparing the output table structure with a ground-truth table structure and assessing whether it is correct. An example of the ground-truth table structure is a human-annotated table structure, where horizontal and vertical lines 308 have been drawn through the elements correctly.

Table structure 306 as illustrated in FIG. 3A is an example of a substantially correct table structure and how a ground-truth table structure may appear. Note that while a horizontal line is drawn between table elements 304*c* and 304*d*, table element 304*a* correctly does not have a line drawn through it. Similarly, table element 304*e* correctly does not have any vertical lines drawn through it, while a vertical line is correctly drawn between table element 304*a* and table elements 304*c* and 304*d*, and between table elements 304*b* and 304*f*.

A more specific approach for the training of the confidence model will be discussed below.

The trained confidence model can be incorporated directly into applications such as table decomposition and perform large-scale error analysis. Advantageously, the annotated training set for the decomposition model can be used to train the confidence model, since the decomposition model is trained to correctly draw the structure and the confidence model is trained to determine the correctness of the structure. In addition, the confidence model can learn from outputs of the decomposition model since the outputs are provided as input to the confidence model. Hence, no additional data annotation is needed to train the confidence model.

Figure 3B:
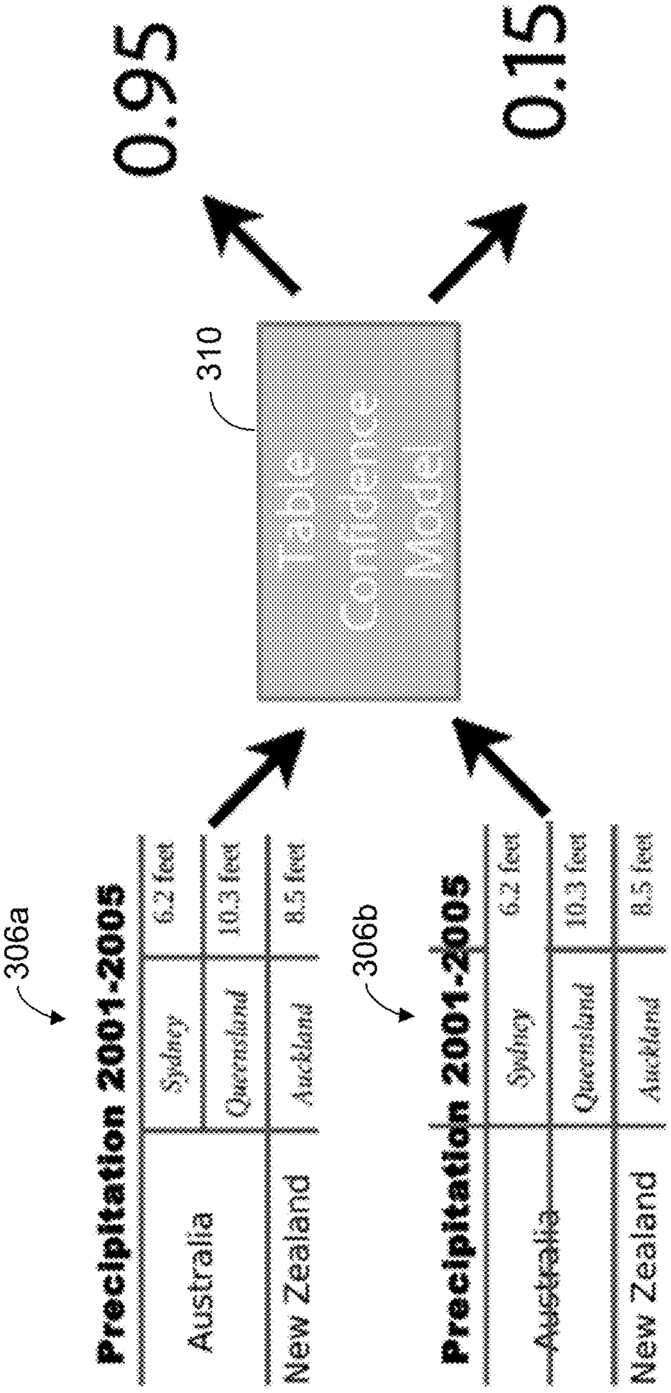
FIG. 3B depicts an example implementation of a trained confidence model configured to receive the output of the structure prediction model of FIG. 3A and generate a score that indicates the correctness of the received output.

FIG. 3B depicts an example implementation of a trained confidence model 310 configured to receive the output of the structure prediction model of FIG. 3A (e.g., table decomposition model 302) and generate a score that indicates the correctness of the received output. The score can be in various formats, such as a percentage (0-100%), a decimal from 0 to 1 inclusive, or a binary output (high/low confidence, correct/incorrect structure, etc.). In one example, a predicted table structure 306*a* (which may be table structure 306 output by the table decomposition model 302 in FIG. 3A) is provided to the confidence model 310, and the confidence model 310 generates a likelihood of correctness of 0.95 or 95%. It can be seen that the lines drawn between table elements in the predicted table structure 306*a* appears substantially correct, properly separating the table elements into their respective cells. In another example, another predicted table structure 306*b* is provided to the confidence model 310, and the confidence model 310 generates a likelihood of correctness of 0.15 or 15%. It can be seen that the lines drawn in the predicted table structure 306*b* do not appear correct, with lines drawn through table elements rather than separating the elements (e.g., lines are drawn through "Australia" and "Precipitation") and a missing line between table elements ("Sydney" and "6.2 feet" are not separate by a line). Thus, the predicted likelihood of correctness accurately reflects the correctness of the respective predicted table structures.

Various confidence models can be employed to determine the likelihood of correctness.

"Black-Box" Confidence Model

Figure 4:
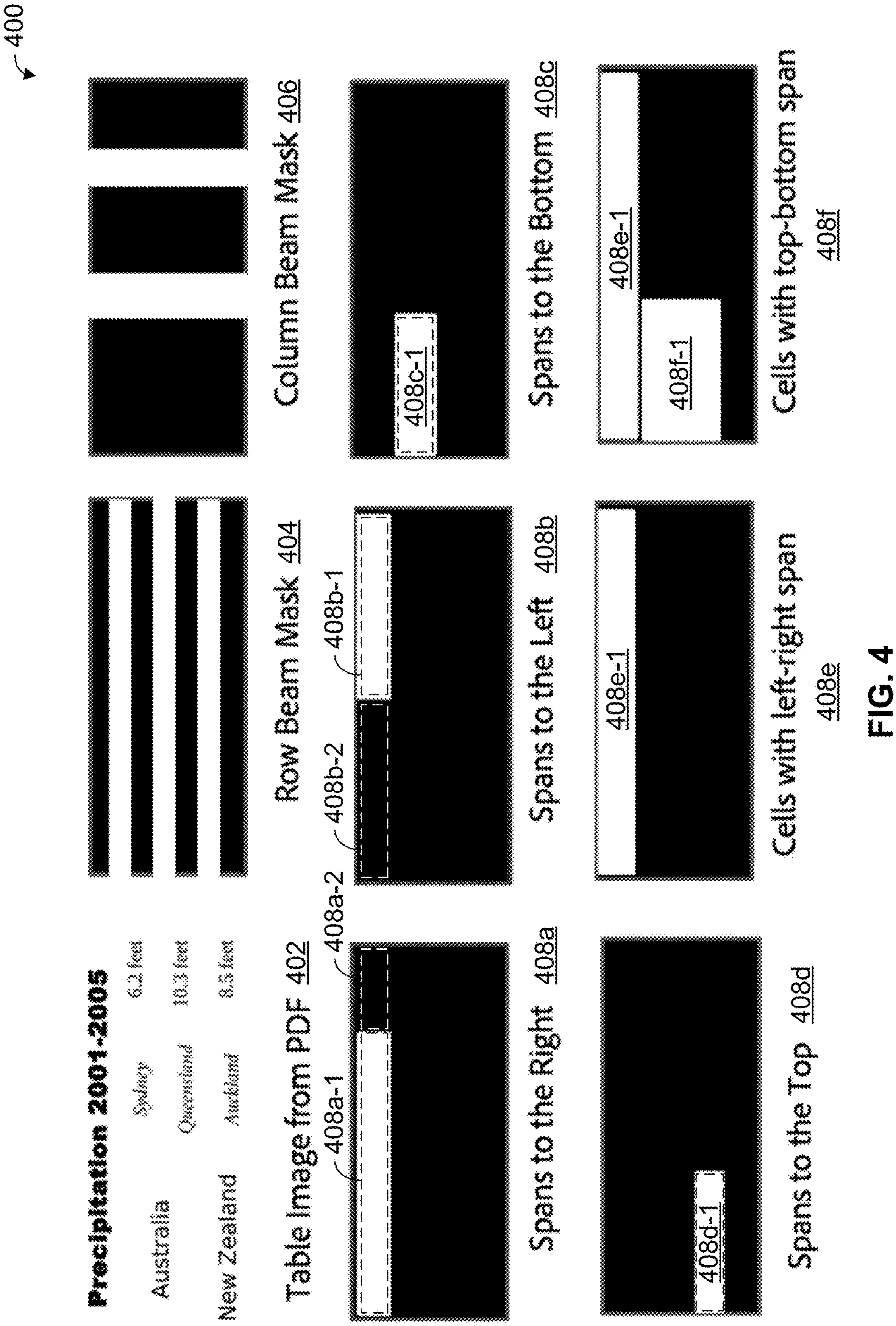
FIG. 4 illustrates examples of input channels, which are binary masks that can be derived from a structure prediction model.

In some embodiments, the confidence model is a convolutional neural network (CNN) that is configured to encode the object (e.g., PDF table) and predicted structure as input feature channels. FIG. 4 illustrates examples of such input channels 400, which are binary masks that can be derived from a structure prediction model. The table decomposition model 302 may be an example of the structure prediction model. These nine input channels 400 correspond to the correct table structure 202 and 306 depicted in FIGS. 2 and 3A.

In some embodiments, the confidence model includes N convolution layers, interspersed with Rectified Linear Unit (ReLU) and pooling functions. In some embodiments, these functions are followed by a global pooling operation and a pair of fully connected layers that end up producing a logit for the correctness of the input table (e.g., PDF table) and the table structure (e.g., 306). A logit function may refer to a quantile function associated with the standard logistic distribution. Such function may be represented as $\mathrm{logit}(p)=\log(p/(1-p))$, where p=probability.

ReLU activation may refer to introduction of non-linearity, useful for backpropagation of errors when training a neural network. That is, all the negative values in the feature map (an array of values generated by a filter or a kernel applied to an image) are replaced with zeroes, resulting in deactivation of a node if the output of the linear transformation is less than 0. Such functionality may be represented as $\mathrm{ReLU}(x)=\max(0, x)$. In some implementations, other types of ReLU functionality may be used. For example, Leaky ReLU may be used, which has a small positive slope in the negative area. Such functionality may be represented as, for example, $\mathrm{LReLU}(x)=\alpha x$ for $x<0$; x for $\geq 0$. $\alpha$ may be a fractional value, e.g., 0.1, 0.01. Other examples include Parametric ReLU (PReLU) and Exponential Linear Unit (ELU).

A pooling function is configured to reduce the dimensionality of each rectified feature map from the ReLU activation, while retaining the most important information. In some implementations, max pooling is used, which may refer to defining a spatial neighborhood from a rectified feature map (e.g., a 2×2 window), and taking the largest element from the rectified feature map within that window. A stride of 1, 2, or more may be taken to obtain the maximum value from the window. In some implementations, a 2×2 window for max pooling is applied. However, it is recognized that other window sizes may be selected for max pooling. In addition, in some implementations, other types of spatial pooling may be used, e.g., average pooling, mean pooling, sum pooling (sum of inputs). The pooling function can thereby generate another convolutional representation, e.g., a downsampled output array of pixel values containing, e.g., maximum values from the window applied across the input rectified feature map.

Returning to FIG. 4, a table and associated table structure can be encoded as nine input channels 400 to the confidence model (e.g., to a corresponding neural network) with one of the channels being object data or an image of object (e.g., PDF table image 402), and eight of the channels being binary masks, each binary mask corresponding to a structural aspect of the table structure. For example, the predicted structure (e.g., a grid for the table) can be shown as two binary masks, a mask 404 for row separator regions and a mask 406 for column separator regions, where the separator regions are derived from expanding the grid lines until it touches table elements (e.g., text) from a non-spanning cell. Put another way, the dark regions of the masks correspond to regions where text resides in the table and hence do not include the structure (e.g., grid boundaries forming cells and containing the text), while the light regions indicate separator regions (e.g., row and column separator regions). Because the table structure masks 400 are spatially aligned to the input table image 402, the confidence model can use these binary masks as one of the input features to learn to locally verify that the structure masks match corresponding parts of the table image 402, and estimate the confidence in the predicted structure for the table image 402.

The binary masks also include one or more binary masks 408*a-f* for spanning cells. For example, the mask 408*a* indicates a region 408*a*-1 of the table image 402 that spans to the right, to the region 408*a*-2 to the right of the region 408*a*-1. Spanning in this direction causes the regions of the table image 402 corresponding to 408*a*-1 and 408*a*-2 to merge. The mask 408*b* indicates a region 408*b*-1 of the table image 402 that spans to the left, to the region 408*b*-2 to the left of the region 408*b*-1. The mask 408*c* indicates a region 408*c*-1 that spans to the bottom. The mask 408*d* indicates a region 408*d*-1 that spans to the top. The mask 408*e* indicates a region 408*e*-1 that has a left-right span, which corresponds to the text "Precipitation 2001-2005" in the table image 402. The mask 408*f* indicates a region 408*f*-1 that has a top-bottom span, which corresponds to the text "Australia" in the table image 402. In some cases, a given mask indicates more than one span, such as via regions 408*e*-1 and 408*f*-1 in mask 408*f*.

In some implementations, this type of "black-box" confidence model (able to provide confidence scores for any table decomposition algorithm) is trained to provide a likelihood of correctness for each of the binary masks. In various scenarios, the binary masks include one or more of the foregoing examples of binary masks 408*a-f*, or other types of masks (e.g., left-bottom span). The likelihoods of correctness may then be combined to produce a composite likelihood. For example, the likelihoods of correctness for each mask can be averaged to produce a likelihood of 0.95. In some cases, some masks may be given higher weight to produce a likelihood based on a weighted average. In other implementations, such as other complex tasks, scoring the likelihood of independent tasks (grid prediction and merge prediction in the above embodiments) individually and then combining is a valid approach.

The table structure masks 400 shown in FIG. 4 are binary such that they can be compatible with any black-box table decomposition algorithm. However, in some embodiments, the confidence model is extended from the foregoing implementations by adding additional input feature channels.

"Decomposition-Based" Confidence Model

Figure 5:
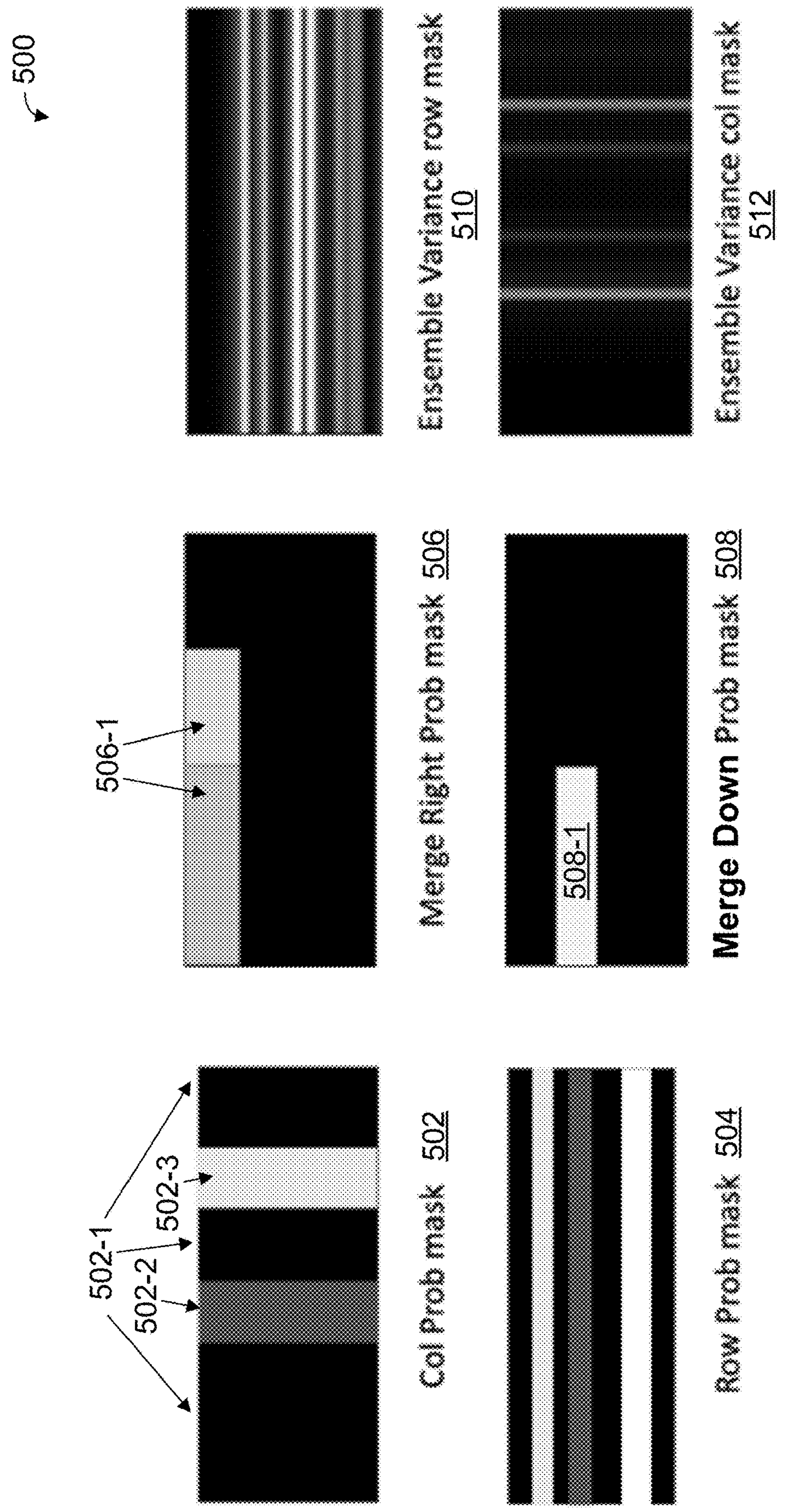
FIG. 5 illustrates examples of additional input feature channels that reflect raw probabilities produced by a table decomposition model.

FIG. 5 illustrates examples of such additional input feature channels 500. Binary masks 400 can be augmented by input feature channels 500 that reflect raw probabilities produced by a table decomposition model. For example, a column probability mask 502 indicates the probabilities that a given region includes a table element such as text. Darker regions 502-1 indicate a high probability that text resides in the corresponding column regions of a table image (e.g., PDF table image 402) and hence do not include structure (e.g., grid lines). Semi-dark region 502-2 indicates a moderate probability that text resides in the corresponding regions of the table image and may or may not include the structure. Lighter region 502-3 indicates a low probability that text resides in the corresponding regions of the table image and hence is a likely area for structure (e.g., grid lines) to be placed. Row probability mask 504 indicates similar probabilities of table elements existing within rows. Merge right probability mask 506 indicates regions 506-1 that should be merged to the right. Merge down probability mask 508 indicates a region 508-1 that should be merged to the bottom.

In embodiments of a "decomposition-based" confidence model, in which there is a single split model (which predict the table grid) in the decomposition model, the probabilities of that decomposition model can be used for the non-binary masks of the row and column separator regions (e.g., 502, 504). However, in embodiments of the "decomposition-based" confidence model in which the decomposition model uses an ensemble of split models (e.g., in order to produce improved accuracy), there are multiple (e.g., 10) sets of raw probabilities. There are many options for how to input these to the confidence model, such as including them all, taking their average, taking the best one, etc.

Another way to input multiple raw probabilities is to determine the per-pixel average probability and the per-pixel probability variance. If all split models tend to agree and output similar probabilities for some pixels (e.g., based on a threshold error range), the variance of those pixels will be low. Conversely, in image regions where the models disagree, the probability variance will be high. Since ensemble agreement is generally correlated with confidence in a prediction, the variance of the probabilities is a useful feature for the confidence model. For instance, low variance (e.g., below a threshold) may indicate greater confidence in the probabilities. FIG. 5 illustrates an ensemble variance row mask 510 and an ensemble variance column mask 512. Lighter regions indicate low variance and may correspond to regions of a table image (e.g., 402) where there is a higher likelihood that having structure (e.g., grid lines) there is correct. A similar procedure could be employed with merge models (which predict spanning cells) to look to their relative agreement and agreement in probabilities.

Decomposed Confidence Model

As noted previously, multiple confidence models can be used in conjunction or in parallel, e.g., one per machine learning component. Specifically, the confidence pertaining to object structure (e.g., table structure) can be decomposed into two parts: (1) predicting if the grid (e.g., grid lines and/or their coordinates) is correct and (2) predicting if the spanning cells are correct (e.g., whether merging of cells is correct). Hence, in some embodiments, a pair of binary classifiers are trained, where one classifier is configured to predict if the grid is correct and the other classifier is configured to predict if the spanning cells are correct. The probabilities of correctness from both these models can be multiplied to produce a single composite probability value that the entire table structure is correct. Therefore, if either individual probability is low, the resulting combined probability is guaranteed to be at least as small. Such pairing of models (classifiers) has been found to be more accurate than a single confidence model trained on the same data and inputs.

In some embodiments, these models share the same architecture as the previously discussed "black-box" and "decomposition-based" visual models, but differ in their inputs and training targets. The training target for the grid-confidence model is the binary label representing whether the output table structure's grid is correct, regardless of the accuracy of the output spanning cells. The input feature maps of the grid-confidence model may include for example row beam mask 404 and column beam mask 406, but input feature maps representing spanning cells are omitted from the input of the grid-confidence model. For the span-confidence model, only tables with correctly predicted grids are used for training, and the training target is whether all the spanning cells are correct (no false positives nor false negatives). The input feature channels are only the table image and the masks related to spans, e.g., table image 402 and spans 408*a-f*.

One advantage of this approach is that the grid-confidence model can be run using only the output of the split model(s) of the table decomposition model, and not the merge model(s). Therefore, the grid-confidence model can be run before or in parallel with the merge model. Alternatively, since the confidence models are much smaller and faster to execute than the merge model, a low grid-confidence score could be used to short-circuit the evaluation of the merge model for some applications. As an example, if the grid confidence is low enough that it is already known that a PDF table will not be converted to HTML (HyperText Markup Language), the application can skip running the relatively time-intensive merge model and thereby reduce the user wait time.

Natural Language Confidence Model

The previously described confidence model types use the visual layout of the input table image to see if the provided structure is compatible. An alternate paradigm is to use the table elements such as table text itself. A table structure output divides not just areas of the input table into rows, columns, and cells, but also segments the text within the table into the same. In Natural Language Processing (NLP), Language Models (LMs) are a technology that can, given a segment of text, predict how likely that text occurs in the language. Presumably, when table text is incorrectly organized into cells, nonsensical text sequences are produced that can be detected by LMs.

In some embodiments of this type of model incorporating an LM, the input is a matrix of strings representing the text of each cell. If there are spanning cells, the entire text of the spanning cell is repeated for each entry in the matrix that the spanning cell covers, and special tokens are used to indicate that the text is part of a spanning cell. One example of an NLP model utilized with the input table is Tabular Information Embedding (TABBIE), a pretraining methodology specifically for tables that transforms the text of each cell into an embedding vector using a series of self-attention operations that only allow attention from a cell to other cells in its row or column. Once the contextualized text embedding for each cell is obtained, a linear classifier is applied separately to each cell to predict if that cell is correct or not. To determine the entire table probability of being correct, the per-cell probability may be averaged. In some variants, some cells may be weighted differently depending on size, location, etc., and a weighted average may be determined.

Training of the Confidence Model

In some embodiments, the confidence model is a machine learning binary classifier model. Hence, it relies on a training dataset. To expound on the above, in the case of training a confidence model for a table decomposition model, the training dataset includes:

(1) The PDF table and all derivable data. This includes the raster table image, table elements (e.g., word, text) with bounding boxes, binary masks, and/or vector graphic rule lines, etc. This is essentially the input to the table decomposition model. In some implementations, bounding boxes are defined by x and y coordinates of the upper-left corner of a rectangle and the such coordinates of the lower-right corner. In some implementations, bounding boxes are defined by (x,y) coordinates of the center of the bounding box, and the width and height of the box. Strictly speaking, bounding boxes are not a structural boundary nor do they define structure. However, they define or indicate bounds, or a location and size, of the table element.

(2) The output of the table decomposition model. This includes the table structure composed of the grid coordinates and the spanning cells. See, e.g., grid 204 and spanning cells 206 of FIG. 2. It also includes table decomposition model-specific information, e.g., the raw output probabilities of each component in the table decomposition model.

(3) A binary label indicating if the output table structure is a correct structure for the input PDF table. The binary label may be a 1 or 0, yes or no, correct or incorrect, or the like.

As noted above, it is straightforward to convert the training data for the table decomposition model into confidence model training data with no additional manual labeling of data. The training data for the table decomposition model is composed of the first input (1) from above as well as manually annotated ground-truth table structure. In some implementations, the ground-truth table structure also includes a raster table image, table elements with bounding boxes, and/or vector graphic rule lines to match the input PDF table. For a given version of the table decomposition model, an inference procedure is run over all of its training data, recording the items from output (2) above, including, e.g., predicted table structure, grid coordinates, spanning cells.

As an aside, in training the table decomposition model, a loss function can be used with the output predicted table structure components (e.g., grid coordinates) and ground truth (e.g., ground-truth grid coordinates). For example, gradient descent can be implemented to minimize the loss (error). Error in this case can be defined as the difference or distance between the coordinates of the predicted grid and the ground truth overlap.

Hence, the confidence model can be trained on the same dataset including (1) and (2). Subsequently, the predicted table structure is compared with the ground-truth table structure according to the same accuracy measure used to assess the correctness of the table decomposition model to obtain the binary label (3). Note that, while no additional data is needed, the training can still be done with data that the table decomposition model was not trained on as long as the table structure is manually annotated or the binary label for (3) is manually provided.

An optimization function can be used for the training of the confidence model. In some embodiments, the optimization can be a binary-cross entropy loss function between the confidence model predicted class (correct or incorrect) and the binary label. For example, an error or difference between the prediction of likelihood of correctness of the confidence model and the binary label can be compared. The prediction will be a value between 0 and 1, inclusive, while the binary label will be a binary value of either 0 or 1. For example, the confidence model may predict a value of 0.65 for a correct table structure (binary value of 1). Hence, the error would be 0.35 in this case. A cost or loss minimization function such as gradient descent can be used to minimize the error over the training set or to reach a sufficiently small error. In some implementations, the sufficiently smaller error is defined by a threshold, e.g., 0.05. This would indicate a sufficiently high score close to 1. For example, a sufficiently high score of 0.95 (a threshold error of 0.05) could correspond to the predicted table structure 306*a* and may be deemed sufficiently correct. In some implementations, optimization settings such as stochastic gradient descent optimizer, learning rate decay, L2 parameter regularization, momentum, and/or early stopping based on a validation set (a portion of the training data, e.g., 20% set aside for validation) may be set and/or adjusted to achieve convergence and optimal loss minimization.

Example Quantitative Comparisons

The effectiveness of the aforementioned confidence models can be associated with two metrics: the Area Under the Precision-Recall Curve (AUPRC), and the recall of good table structures at 90% precision (R@90). The confidence model provides a continuous score from 0 to 1, and it is dependent on the application to determine the threshold to categorize predictions as acceptable or not. AUPRC represents the average performance measured over all such thresholds.

In some cases, confidence models trained according to the approach disclosed herein are associated with varying AUPRC or R@90 scores depending on an evaluation setting of the model, as shown in Table 1. Training these confidence models as disclosed herein resulted in high detection accuracy, in some cases having % good structures of over 70%, AUPRC of over 94, and R@90 of over 77, showing marked improvements over the basic black-box model.

TABLE 1

Table structure confidence models evaluated on example evaluation settings. Evaluation settings with different letters correspond to different versions of the model.

| Confidence Model Type | Evaluation Setting | % Good Structures | AUPRC | R@90 |
|---|---|---|---|---|
| Black-box | Validation set | — | 82.8 | — |
| Decomposition-based | Validation set | — | 87.5 | — |
| Black-box | Version A | 56 | 86.1 | 49.7 |
| Decomposed | Version B | 71 | 94.1 | 77.9 |

"% good structures" refers to how many table decomposition model predictions are correct. The higher this number, the more difficult it is to detect failures since there are fewer of them. R@90 means that a confidence score threshold was chosen to get about 90% precision and measured the corresponding recall value. In this context, recall may refer to the fraction of relevant instances that were retrieved, or in other words, true positive observations over true positive observations and false negative observations. The models trained according to the approach disclosed herein are associated with higher quantitative measures, showing improvement over the basic black-box model.

Notably, the table confidence model is capable of serving a role in monitoring privacy preservation when table decomposition is performed on user data. Table decomposition predictions and confidence scores can be examined by categorizing tables by certain properties (border types, pixel size, number of rows and/or columns, etc.), and within each category, examining the distribution of confidence scores. In some cases, the distribution of confidence scores for the corresponding internal tables can be used as a reference point.

Figure 6:
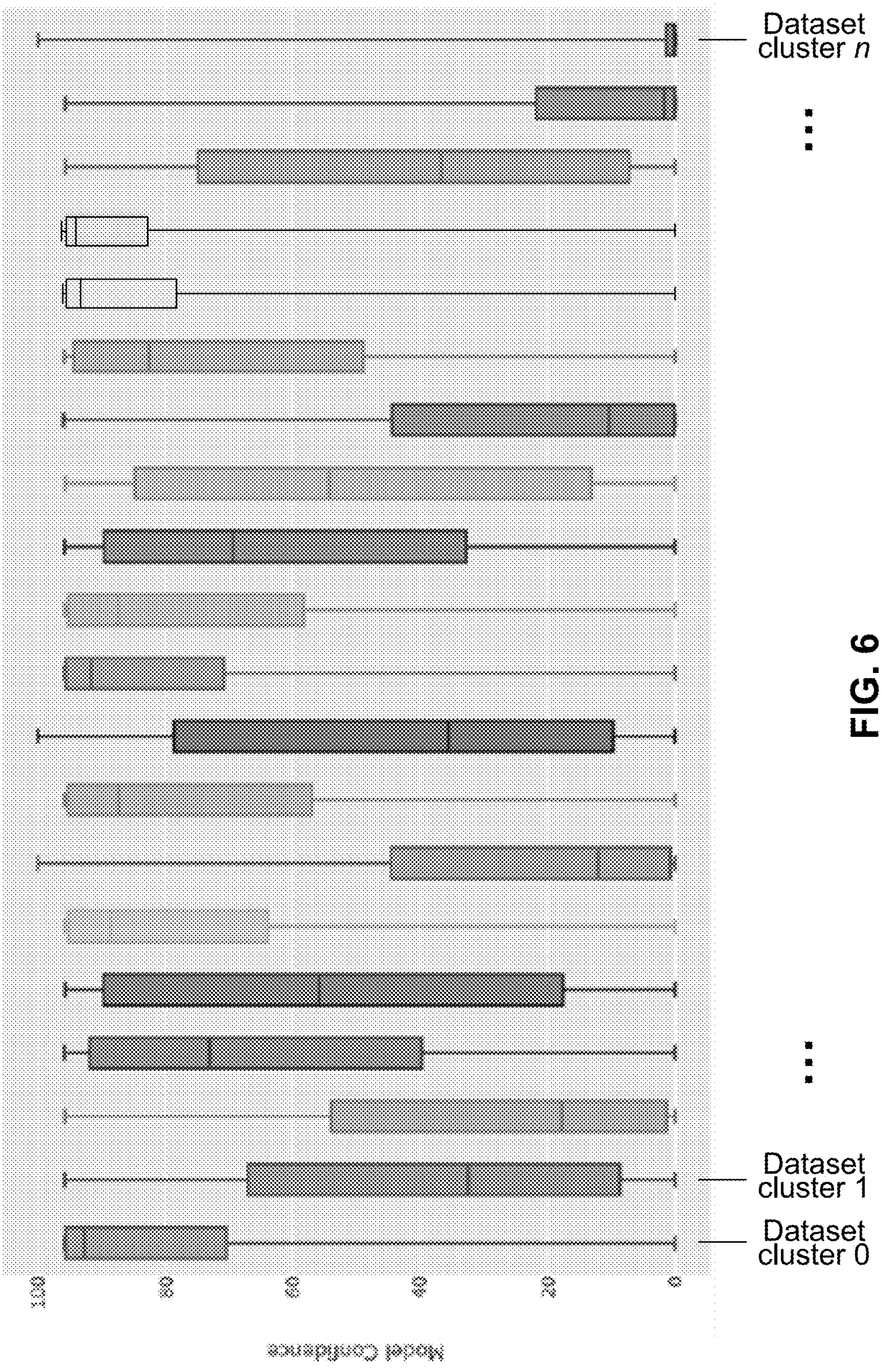
FIG. 6 depicts a distribution of example confidence scores on pre-defined clusters of user data used with a table decomposition model.

FIG. 6 depicts a distribution of example confidence scores on 20 pre-defined clusters of user data used with a table decomposition model. It is apparent that there are clusters where the confidence tends to be high and where it tends to be low. This indicates which clusters of tables on which the table decomposition model does not perform well, which is useful feedback for improving the model. In some approaches, changes can be made, and new distributions of confidence scores can be examined to see if the changes were effective or not.

Methods

Figure 7:
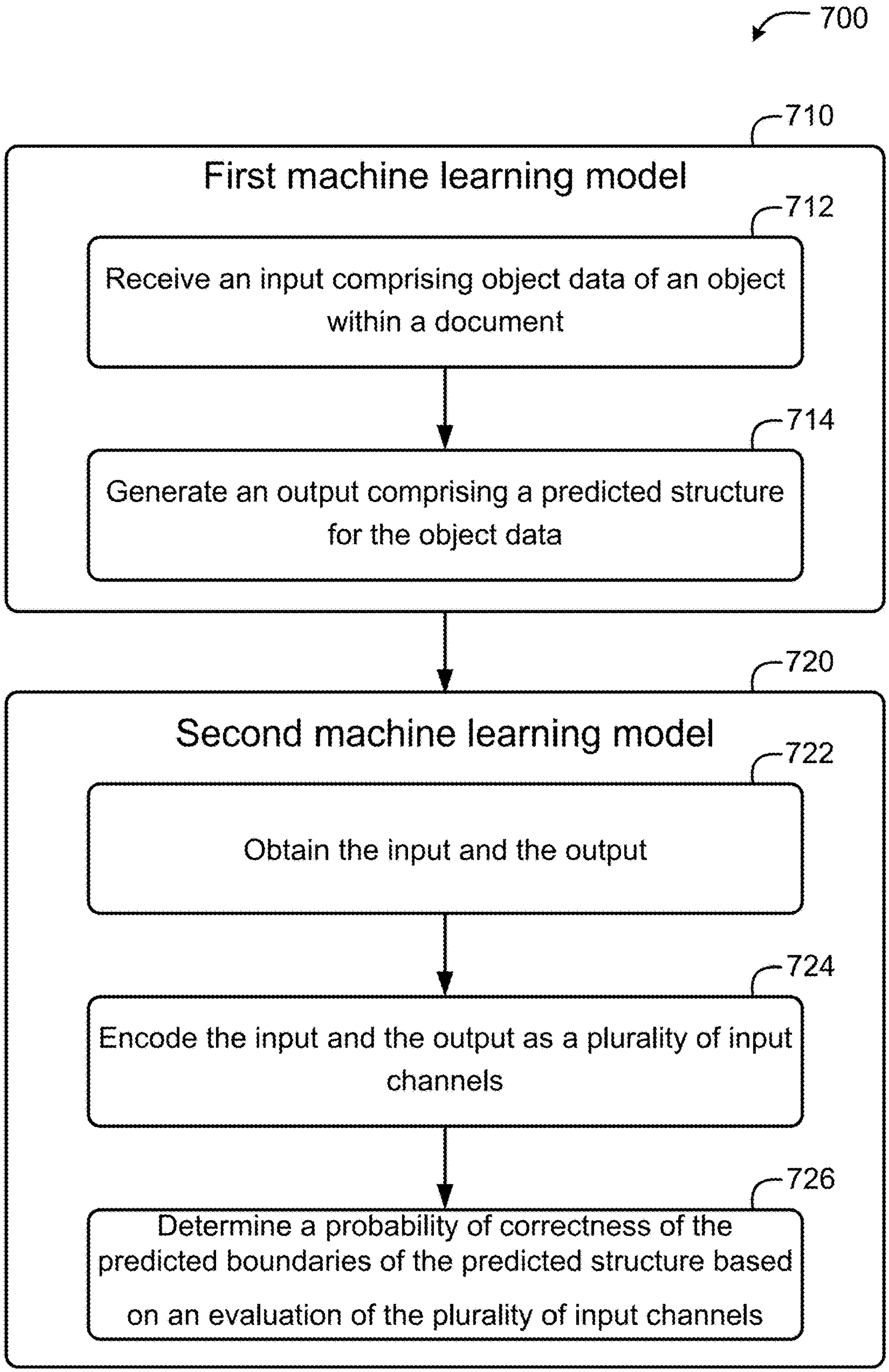
FIG. 7 is a flow diagram of a method for evaluating a confidence of a structure prediction.
Figure 9:
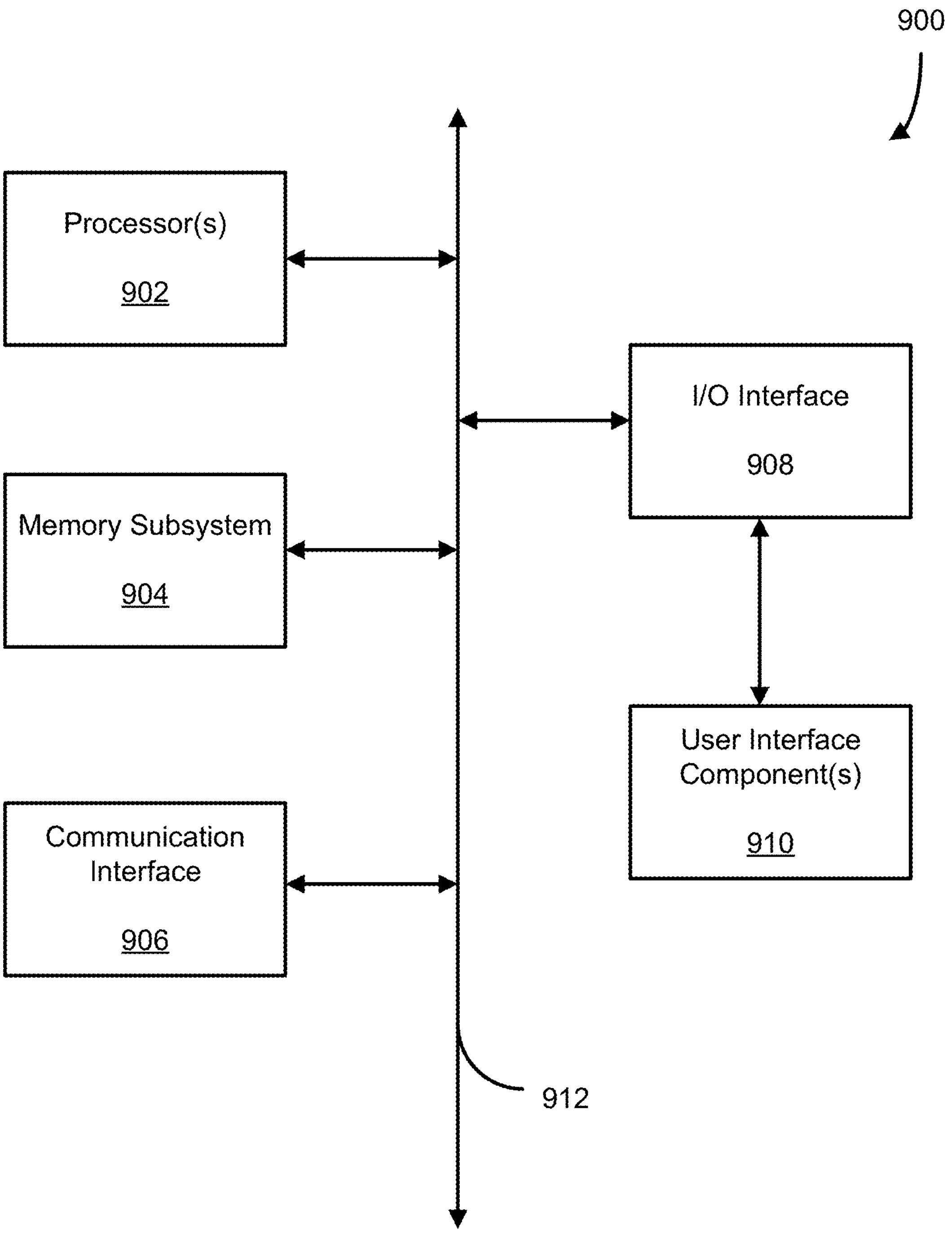
FIG. 9 shows a schematic diagram of an example computing device for implementing the methods, systems, and techniques described herein in accordance with some embodiments. Like reference numbers and designations in the various drawings indicate like elements.

FIG. 7 is a flow diagram of a method 700 for evaluating a confidence of a structure prediction, in accordance with some embodiments. In some embodiments, the functionality illustrated in one or more of the steps shown in FIG. 7 is performed by hardware and/or software components of a suitable computerized system or computerized apparatus, e.g., a user device (mobile or otherwise), a workstation, a server. In some implementations, the computerized system or apparatus is configured to operate the various components and modules implementing at least portions of the architecture of FIG. 1. In some aspects, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 700. Example components of the computerized apparatus are illustrated in FIG. 9, which are described in more detail below.

It also should be noted that the operations of the method 700 may be performed in any suitable order, not necessarily the order depicted in FIG. 7. In some embodiments, at least some portions of the steps may be performed substantially concurrently. Further, the method 700 may include additional or fewer operations than those depicted in FIG. 7 to accomplish the evaluation of a confidence of a structure prediction.

FIG. 7 depicts operations performable by a first machine learning model 710 and a second machine learning model 720.

At block 712, the method 700 includes the first machine learning model 710 receiving an input comprising object data of an object within a document. In some embodiments, the object is a table containing object data. Examples of object data include contents of the table. Table 304 (which does not have any horizontal or vertical lines) is an example of the table, and elements 304*a*-304*e* are examples of contents of the table. In some embodiments, the object (e.g., the table) is embedded in a document, such as a PDF document. Depending on the application, the object is found in myriad other document types (e.g., text file, presentation file). In some embodiments, the input also includes table information, text, bounding boxes, spatial locations (without structure), raster table image, etc.

In some embodiments, the first machine learning model is a structure prediction model (e.g., structure prediction model 302 shown in FIG. 3A, which is a table decomposition model) configured to predict a structure for the object (e.g., a table). In some implementations, the first machine learning model (e.g., structure prediction model) is a component of a machine learning model. In some implementations, the first machine learning model (e.g., structure prediction model) is a machine learning model that includes one or more components. Component 104*d* of a machine learning model 103 (as shown in FIG. 1) is one example of the first machine learning model. The machine learning model 103 is another example of the first machine learning model.

At block 714, the method 700 includes the first machine learning model 710 generating an output comprising a predicted structure for the object data. In some embodiments, the predicted structure includes predicted boundaries that contain or isolate one or more elements of the object corresponding to the object data. In some implementations, the one or more elements include text (e.g., elements 304*a*-304*e* as shown in FIG. 3A). In some implementations, the one or more elements include visual content, such as an image. For example, elements embedded and arranged within a PDF document can include text and graphics. In some cases, the image is a raster image of text. According to some implementations, the predicted boundaries include lines such as grid lines, e.g., horizontal, vertical, and/or diagonal lines. Horizontal and vertical lines 308 drawn through the table 304 to form a table structure 306 are examples of the predicted structure. In some cases, boundaries include lines in other forms such as curved or a closed lines, e.g., circle, oval, polygon (e.g., rectangle, triangle). In some implementations, grid coordinates and/or spanning cell information are included with the predicted boundaries.

In some embodiments, the predicted structure includes spanning cells, which indicate merging of cells. In cases where the a table element is of a different size than other table elements, e.g., table element 304*a* corresponds to both table elements 304*c* and 304*d*, the cells corresponding to the table element 304*a* should be merged to contain and/or vertically center the table element 304*a*, as depicted in FIG. 3A.

In some embodiments, the first machine learning model 710 is monitored for failure by the second machine learning model 720.

At block 722, the method 700 includes the second machine learning model 720 obtaining the input and the output. In some embodiments, the input and the output are the input and output received and generated by the first machine learning model (blocks 712 and 714). In some embodiments, the input and output of the first machine learning model are received and generated while the first machine learning model is in operation. That is, the input and output are obtained while the first machine learning model is in the inference stage.

In some embodiments, the second machine learning model is a confidence model configured to monitor for failure of a machine learning model or component (such as the first machine learning model). Confidence model 102 of FIG. 1 is an example of the confidence model. In some scenarios, the confidence model monitors for failure of a table decomposition model.

At block 724, the method 700 includes the second machine learning model 720 encoding the input and the output as a plurality of input channels. In some embodiments, the input channels are binary masks from a CNN. Input channels 400 are examples of the binary masks, where dark regions of the masks correspond to regions where text resides in the table, and include a mask for row separator regions and a mask for column separator regions, where the separator regions are derived from expanding the grid lines until it touches table elements (e.g., text) from a non-spanning cell. In some implementations, there are eight channels or binary masks, as depicted in FIG. 4. Mask 404 as shown in FIG. 4 is an example of a mask for the row separator regions, and mask 406 as shown in FIG. 4 is an example of a mask for the column separate regions. Binary masks 408*a-f* are examples of binary masks for spanning cells. In some embodiments, the input channels are input feature channels that reflect raw probabilities produced by the table decomposition model. Input feature channels 500 are examples of the input feature channels, where darker regions and lighter regions correspond to higher and lower probabilities.

At block 726, the method 700 includes the second machine learning model 720 determining a probability of correctness of the predicted boundaries of the predicted structure based on an evaluation of the plurality of input channels. In some embodiments, the plurality of input channels are compared with the object data (e.g., table information, text locations, bounding boxes) included in the received input. For example, a mask for row separator regions is compared with the locations (e.g., coordinates) of the contents of the table. Since the input channels are spatially aligned to the input table, the confidence model can verify that the masks (e.g., dark regions) match corresponding parts of the table and to what extent (e.g., amount of overlap between mask regions and table elements, distance between mask boundaries and structure boundaries (e.g., grid lines)). Binary masks for column separator regions and spanning cells can also be compared to the locations of the contents of the table. In some implementations, input feature channels indicative of probabilities are used. Input feature channels 500 are examples of the input feature channels, where darker regions and lighter regions correspond to higher and lower probabilities.

In an example of blocks 722-726, the confidence model is a table confidence model, such as table confidence model 310 (as shown in FIG. 3B) configured to receive the output of the structure prediction model and generate a score that indicates the correctness of the received output. For example, after the table decomposition algorithm receives table elements and predicts a structure (e.g., grid lines to separate and isolate the elements), the table confidence model outputs a score, such as 0.95 or 0.15, indicating a corresponding likelihood of correctness.

In some implementations, multiple confidence models can be used in conjunction or in parallel. For example, the confidence pertaining to object structure (e.g., table structure) can be decomposed into two parts: (1) predicting if the grid (e.g., grid lines and/or their coordinates) is correct and (2) predicting if the spanning cells are correct (e.g., whether merging of cells is correct). Hence, in some embodiments, a pair of binary classifiers are trained, where one classifier is configured to predict if the grid is correct and the other classifier is configured to predict if the spanning cells are correct. The probabilities of correctness from both these models can be multiplied to produce a single composite probability value that the entire table structure is correct. Therefore, if either individual probability is low, the resulting combined probability is guaranteed to be at least as small.

In some embodiments, table elements such as table text itself are used with an NLP language model (e.g., TABBIE) to predict whether table text is incorrectly organized into cells. Presumably, when table text is incorrectly organized into cells, nonsensical text sequences are produced that can be detected by language models.

Figure 8:
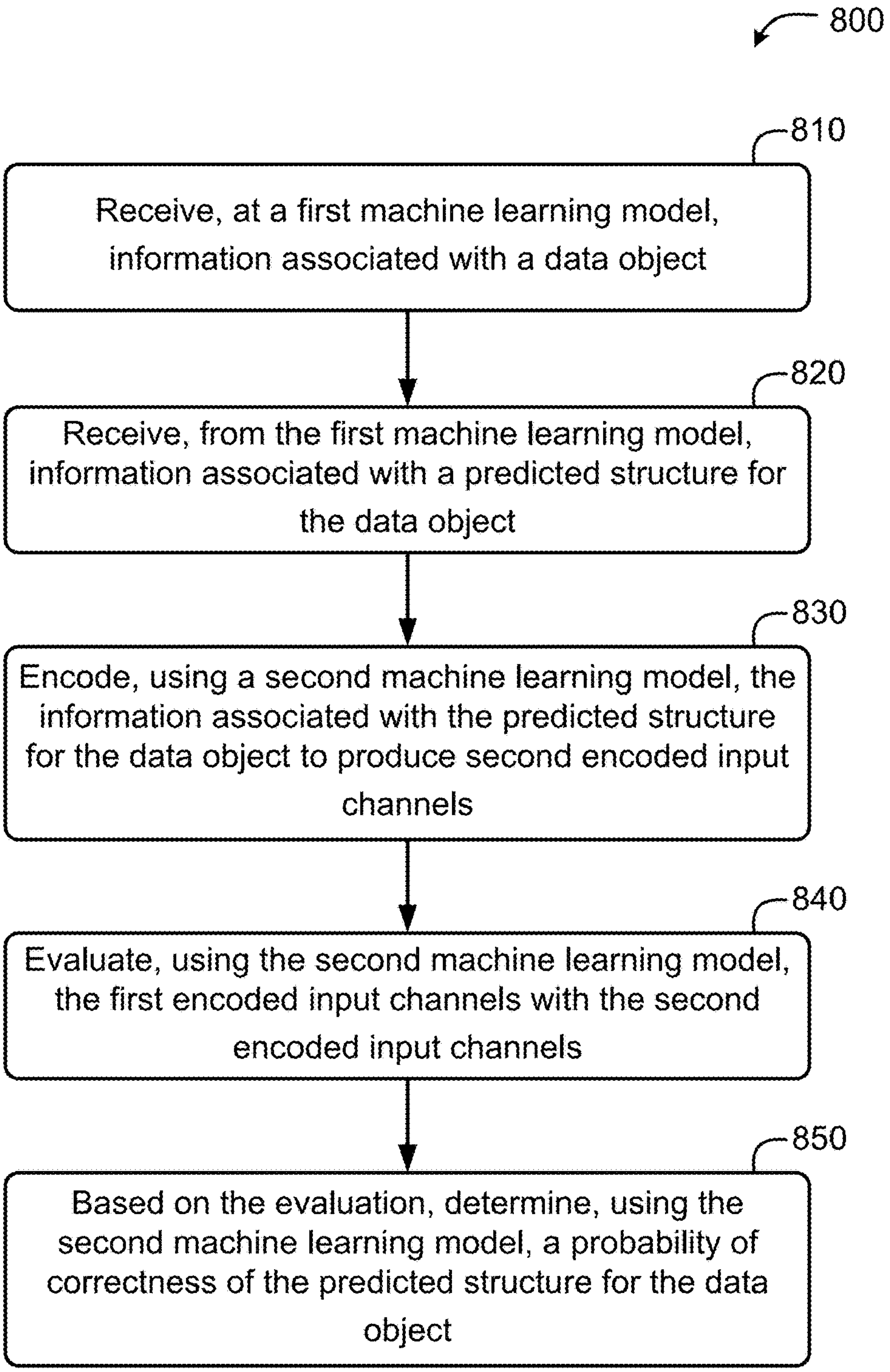
FIG. 8 is a flow diagram of a method for determining a confidence of an output of a machine learning model.

FIG. 8 is a flow diagram of a method 800 for determining a confidence of an output of a machine learning model, in accordance with some embodiments. In some embodiments, the functionality illustrated in one or more of the steps shown in FIG. 8 is performed by hardware and/or software components of a suitable computerized system or computerized apparatus, e.g., a user device (mobile or otherwise), a workstation, a server. In some implementations, the computerized system or apparatus is configured to operate the various components and modules implementing at least portions of the architecture of FIG. 1 or 3B. In some aspects, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 800. Example components of the computerized apparatus are illustrated in FIG. 9, which are described in more detail below.

It also should be noted that the operations of the method 800 may be performed in any suitable order, not necessarily the order depicted in FIG. 8. In some embodiments, at least some portions of the steps may be performed substantially concurrently. Further, the method 800 may include additional or fewer operations than those depicted in FIG. 8 to accomplish the evaluation of a confidence of a structure prediction.

At block 810, the method 800 includes receiving information associated with a data object, at the machine learning model. In some embodiments, information associated with the data object is the same data provided to the machine learning model, and is received by a second machine learning model. In some cases, the information associated with the data object is received by a second machine learning model from the machine learning model.

In some embodiments, the data object includes a table containing data. Table 304 (which does not have any horizontal or vertical lines) is an example of the table. Elements 304*a*-304*e* are examples of data in the table, and may be text, image, or other content. In some embodiments, information associated with the data object include table information, text, bounding boxes, spatial locations (without structure), raster table image, etc.

At block 820, the method 800 includes receiving, from the machine learning model, information associated with a predicted structure for the data object. In some embodiments, the first machine learning model is a structure prediction model (e.g., structure prediction model 302 shown in FIG. 3A, which is a table decomposition model) configured to predict a structure for the object (e.g., a table). In some embodiments, the predicted structure includes predicted boundaries that contain or isolate one or more elements of the data object. In some implementations, the one or more elements include text (e.g., elements 304*a*-304*e* as shown in FIG. 3A). In some implementations, the one or more elements include visual content, such as an image. For example, elements embedded and arranged within a PDF document can include text and graphics. In some cases, the image is a raster image of text.

According to some implementations, the predicted boundaries include lines such as grid lines, e.g., horizontal, vertical, and/or diagonal lines. Horizontal and vertical lines 308 drawn through the table 304 to form a table structure 306 are examples of the predicted structure. In some cases, boundaries include lines in other forms such as curved or a closed lines, e.g., circle, oval, polygon (e.g., rectangle, triangle). In some implementations, grid coordinates and/or spanning cell information are included with the predicted boundaries.

At block 830, the method 800 includes encoding, using a second machine learning model, the information associated with the predicted structure for the data object to produce encoded input channels. In some embodiments, the second machine learning model is a confidence model configured to monitor for failure of a machine learning model or component (such as the first machine learning model). Confidence model 102 of FIG. 1 is an example of the confidence model. In some scenarios, the confidence model monitors for failure of a table decomposition model.

In some embodiments, the encoded input channels include binary masks, each binary mask corresponding to a structural aspect of the table structure. For example, the predicted structure (e.g., a grid for the table) can be shown as two binary masks, e.g., a mask for row separator regions and a mask for column separate regions, where dark regions of the masks correspond to regions where text resides in the table, and where the light regions are derived from expanding the grid lines until it touches table elements (e.g., text) from a non-spanning cell. In some implementations, there are eight channels or binary masks, as depicted in FIG. 4. Mask 404 as shown in FIG. 4 is an example of the mask for the row separator regions, and mask 406 as shown in FIG. 4 is an example of the mask for the column separate regions. Binary masks 408*a-f* are examples of binary masks for spanning cells.

At block 840, the method 800 includes evaluating, using the second machine learning model, the information associated with the data object with the encoded input channels. In some embodiments, the encoded input channels are compared with the information associated with the data object (e.g., table information, text locations, bounding boxes) associated with the received information. For example, a mask for row separator regions is compared with the locations (e.g., coordinates) of the contents of the table. Since the input channels are spatially aligned to the input table, the confidence model can verify that the masks (e.g., dark regions) match corresponding parts of the table and to what extent (e.g., amount of overlap between mask regions and table elements, distance between mask boundaries and structure boundaries (e.g., grid lines)). Binary masks for column separator regions and spanning cells can also be compared to the locations of the contents of the table. In some implementations, input feature channels indicative of probabilities are used. Input feature channels 500 are examples of the input feature channels, where darker regions and lighter regions correspond to higher and lower probabilities.

At block 850, the method 800 includes based on the evaluating, determining, using the second machine learning model, a probability of correctness of the predicted structure for the data object. In some embodiments, a score is generated based on the evaluation (e.g., comparison of input channels or input feature channels, with the information associated with the data object), such as 0.95 or 0.15, indicating a corresponding likelihood of correctness.

In some implementations, multiple confidence models can be used in conjunction or in parallel. For example, one classifier is configured to predict if the grid is correct and the other classifier is configured to predict if the spanning cells are correct. The probabilities of correctness from both these models can be multiplied to produce a single composite probability value that the entire table structure is correct.

Apparatus

FIG. 9 shows a schematic diagram of components of a computing device 900 that is implemented in a computing system in accordance with some implementations. As illustrated, computing device 900 includes a bus 912 that directly or indirectly couples one or more processors(s) 902, a memory subsystem 904, a communication interface 906, an input/output (I/O) interface 908, and/or one or more user interface components 910. It should be noted that, in some embodiments, various other components are included in a computing device that are not shown in FIG. 9, and/or one or more components shown in FIG. 9 are omitted.

In some embodiments, computing device 900 includes or is coupled to a memory subsystem 904. Memory subsystem 904 includes a computer-readable medium (e.g., non-transitory storage medium) or a combination of computer-readable media. Examples of computer-readable media include optical media (e.g., compact discs, digital video discs, or the like), magnetic media (e.g., hard disks, floppy disks, or the like), semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In some embodiments, the computer-readable media includes non-volatile memory, volatile memory, or a combination thereof. In some embodiments, memory subsystem 904 also includes one or more hardware devices such as a solid-state memory, one or more hard drives, one or more optical disk drives, or the like. In some embodiments, memory subsystem 904 stores content files such as text-based files, audio files, image files, and/or video files, etc. In some implementations, the content files include documents, pictures, photos, songs, podcasts, movies, etc. In some embodiments, memory subsystem 904 stores one or more computer program products that are each implemented as a set of instructions (e.g., program code) stored on a computer-readable medium.

A computer program product (e.g., a program stored in or downloadable onto a computer readable medium) includes instructions or program code that are executable by one or more processors (e.g., processor(s) 902, or processor(s) of another computing device communicatively coupled to computing device 900) to perform various operations or functions such as those described with reference to FIGS. 7 and 8. In some embodiments, a computer program product is referred to as a non-transitory computer readable medium storing or comprising instructions to perform certain operations or functions. Examples of a computer program product include firmware, software driver, operating system, or software application. Examples of a software application include data management application (e.g., file management application, document management application, media management application, database application, etc.), communication application (e.g., email application, messaging application, teleconference or meeting application, social media application, etc.), productivity application (e.g., document viewer application, document creation or editing application, etc.), media or interactive application (e.g., web browser, image or photo viewer, audio or video playback application, gaming application, virtual or augmented reality application, shopping application, recommendation or review application, etc.), creativity application (e.g., image, drawing, photo, audio, or video creation or editing application, web page development application, virtual or augmented reality creation or editing application, graphic design application, etc.), or the like.

In some embodiments, a computer program product such as any of the example software application are implemented using one or more neural network or machine learning models. In such embodiments, one or more neural network or matching learning models are trained using computing device 900 (or a computing system that includes computing device 900). Furthermore, in some implementations, computing device 900 (or a computing system include computing device 900) executes the one or more neural network or machine learning models as part of the computer program product to perform inference operations. It should be noted, in some embodiments, the neural network or matching learning model(s) are trained using a computing device or system that is the same as, overlaps with, or is separate from the computing device or system performing inference operations.

Communication interface 906 is used by computing device 900 to communicate with one or more communication networks, and/or other electronic device(s). Example types of communication networks include wired communication networks and/or wireless communication networks. Example types of communication networks include the Internet, a wide-area network, a local-area network, a virtual private network (VPN), an Intranet, or the like. In some embodiments, communication interface 906 utilizes various drivers, wireless communication circuitry, network interface circuitry, or the like to enable communication via various communication networks.

I/O interface 908 includes various drivers and/or hardware circuitry for receiving input from various input devices, providing output to various output devices, or exchanging input/output with various input/output devices. Examples of devices coupled to I/O interface 908 include peripheral devices such as a printer, a docking station, a communication hub, a charging device, etc. In some implementations, some devices coupled to I/O interface 908 are used as user interface component(s) 910. In one example, a user operates input elements of user interface component(s) 910 to invoke the functionality of computing device 900 and/or of another device communicatively coupled to computing device 900; a user views, hears, and/or otherwise experiences output from computing device 900 via output elements of user interface component(s) 910. Some user interface component(s) 910 provide both input and output functionalities. Examples of input user interface component include a mouse, a joystick, a keyboard, a microphone, a camera, or the like. Examples of output user interface component include a display screen (e.g., a monitor, an LCD display, etc.), one or more speakers, or the like. Examples of a user interface components provide both input and output functionalities include a touchscreen, haptic feedback controllers, or the like.

Various embodiments are described herein which are intended to be illustrative. Alternative embodiments may be apparent to those of ordinary skill in the art without departing from the scope of the disclosure. In one example, one or more features from one embodiment are combined with another embodiment to form an alternative embodiment. In another example, one or more features are omitted from an embodiment to form an alternative embodiment without departing from the scope of the disclosure. Additionally, it should be noted that, in some implementations, certain features described herein are utilized without reference to other features described herein.

With reference to the various processes described above, it should be understood that the order in which operations are performed is not limited to the order described herein. Moreover, in some embodiments, two or more operations are performed concurrently and/or substantially in parallel. In some embodiments, what is described as a single operation is split into two or more operations (e.g., performed by the same device, performed by two or more different devices, etc.). In some embodiments, what is described as multiple operations is combined into a single (e.g., performed by the same device, etc.). Descriptions of various blocks, modules, or components as distinct should not be construed as requiring that the blocks, modules, or components be separate (e.g., physically separate) and/or perform separate operations. For example, in some implementations, two or more blocks, modules, and/or components are merged. As another example, a single block, module, and/or components is split into multiple blocks, modules, and/or components.

The phrases "in one embodiment," "in an embodiment," "in one example," and "in an example" are used herein. It should be understood that, in some cases, these phrases refer to the same embodiments and/or examples, and, in other cases, these phrases refer to different embodiments and/or examples. The terms "comprising," "having," and "including" should be understood to be synonymous unless indicated otherwise. The phases "A and/or B" and "A or B" should be understood to mean {A}, {B}, or {A, B}. The phrase "at least one of A, B, or C" and "at least one of A, B, and C" should each be understood to mean {A}, {B}, {C}, {A, B}, {A, C}, {B, C}, or {A, B, C}.

What is claimed is:

1. A method of determining a confidence of an output of a first ma-chine learning model comprising a convolutional neural network, the method comprising:

obtaining an image depicting a data object, wherein the data object comprises a table including a plurality of rows and a plurality of columns;

generating, using the first machine learning model, a first mask and a second mask by applying the convolutional neural network to the image, wherein the first mask indicates a location of the plurality of rows and the second mask indicates a location of the plurality of columns;

encoding, using a second machine learning model, the first mask and the second mask to produce encoded input channels, wherein the encoded input channels represent the location of the plurality of rows and the location of the plurality of columns; and generating, using the second machine learning model, a confidence score based on the image and the encoded input channels, wherein the confidence score indicates a probability of correctness of the depiction of the data object by the image.

2. The method of claim 1, wherein the first mask indicates a location of a spanning cell of the table.

3. The method of claim 1, wherein:

the second machine learning model applies a linear classifier separately to each cell.

4. The method of claim 1, wherein the encoded input channels comprise a plurality of binary masks, a plurality of non-binary masks, or a combination thereof, each representative of locations of content of table elements of the table relative to grid lines of the table.

5. The method of claim 1, wherein the first machine learning model has been trained by:

receiving a ground truth structure for a training data object; and assessing a training prediction of a structure for the training data object with respect to the ground truth structure for the training data object.

6. The method of claim 1, wherein the confidence score is generated using a distribution function.

7. A system, comprising:

one or more memory components;

one or more processing devices coupled to the one or more memory components;

a first machine learning model coupled to the one or more processing devices, wherein the one or more processing devices are configured to cause the first machine learning model to perform operations comprising:

obtaining an image depicting a data object, wherein the data object comprises a table including a plurality of rows and a plurality of columns; and generating a first mask and a second mask by applying a convolutional neural network to the image, wherein the first mask indicates a location of the plurality of rows and the second mask indicates a location of the plurality of columns; and a second machine learning model coupled to the one or more processing devices, wherein the one or more processing devices are configured to cause the second machine learning model to perform operations comprising:

encoding the first mask and the second mask to produce encoded input channels, wherein the encoded input channels represent the location of the plurality of rows and the location of the plurality of columns; and generating a confidence score based on the image and the encoded input channels, wherein the confidence score indicates a probability of correctness of the depiction of the data object by the image.

8. The system of claim 7, wherein each of the first mask and the second mask is a non-binary mask.

9. The system of claim 7, wherein the confidence score is generated using a distribution function.

10. The system of claim 7, wherein:

the first mask indicates a predicted location of one or more of textual content or an image contained in the table.

11. The system of claim 7, wherein the first machine learning model has been trained by:
- receiving a ground truth structure for training object data; and
- assessing a training prediction of a structure for the training object data with respect to the ground truth structure for the training object data.

12. The system of claim 7, wherein:
- the table comprises text; and
- the system comprises a third machine learning model configured to apply a language model to the text to determine the probability of correctness.

13. The system of claim 12, wherein the second machine learning model is further configured to:
- receive data generated by the third machine learning model.

14. A method of training a first machine learning model configured to determine a confidence of an output of a second machine learning model comprising a convolutional neural network, the method comprising:
- obtaining an image depicting a data object, wherein the data object comprises a table including a plurality of rows and a plurality of columns;
- generating, using the second machine learning model, a first mask and a second mask by applying the convolutional neural network to the image, wherein the first mask indicates a location of the plurality of rows and the second mask indicates a location of the plurality of columns;
- receiving, from the second machine learning model, information associated with a predicted structure for the data object, wherein the predicted structure comprises at least the first mask and the second mask;
- obtaining a label indicating a correctness of the predicted structure based on a comparison of the predicted structure with a ground-truth version of the predicted structure; and
- training the first machine learning model based on the information associated with the predicted structure for the data object and the label indicating the correctness of the predicted structure, to generate a trained machine learning model that determines the confidence of the output of the second machine learning model.

15. The method of claim 14, wherein
- the first mask indicates spanning information for one or more cells within the table.

16. The method of claim 14, wherein the training of the first machine learning model comprises:
- predicting, with the first machine learning model, a likelihood of correctness of the predicted structure; and
- minimizing an error associated with the predicted likelihood of correctness and the obtained label.

17. The method of claim 16, wherein the minimizing of the error comprises determining a difference between the obtained label and the predicted likelihood of correctness of the predicted structure, defining a threshold, and performing an iterative optimization process to reduce the difference until the threshold is reached.

18. The method of claim 14, wherein the generated trained machine learning model is configured to:
- receive, from the second machine learning model, information associated with the predicted structure for the data object;
- encode the information associated with the predicted structure for the data object to produce encoded input channels; and
- based on the encoded input channels, determine a probability of correctness of the predicted structure for the data object.

19. The method of claim 14, wherein the second machine learning model has been trained by minimizing an error, the minimizing of the error comprising determining a difference between coordinates of the predicted structure and the ground-truth version of the predicted structure, and performing an iterative optimization process to reduce the difference.

* * * * *